United States Patent [19]
Chapman et al.

[11] Patent Number: 6,165,683
[45] Date of Patent: *Dec. 26, 2000

[54] METALLIZED AZO-ETHER DYES FOR OPTICAL RECORDING LAYERS

[75] Inventors: Derek D. Chapman, Rochester; Ramanuj Goswami, Webster; Csaba Andras Kovacs, Rochester, all of N.Y.

[73] Assignee: Eastman Kodak Company, Rochester, N.Y.

[*] Notice: This patent is subject to a terminal disclaimer.

[21] Appl. No.: 08/588,969

[22] Filed: Jan. 19, 1996

Related U.S. Application Data

[63] Continuation-in-part of application No. 08/361,006, Dec. 21, 1994, abandoned, which is a continuation of application No. 08/140,641, Oct. 21, 1993, abandoned.

[51] Int. Cl.[7] ........................................................ G11B 7/21
[52] U.S. Cl. ............... 430/270.16; 430/945; 430/270.19; 430/273.1; 430/275.1; 369/288; 369/284
[58] Field of Search .............................. 430/270.16, 271.1, 430/945, 273.1, 275.1, 269, 270.19; 369/284, 288; 346/135.1

[56] References Cited

U.S. PATENT DOCUMENTS

| | | | |
|---|---|---|---|
| 4,287,292 | 9/1981 | Chapman et al. | 430/223 |
| 4,358,527 | 11/1982 | Bailey et al. | 430/223 |
| 4,425,422 | 1/1984 | Kamamura et al. | 430/223 |
| 4,521,506 | 6/1985 | Stolzenburg et al. | 430/223 |
| 4,562,139 | 12/1985 | Reczek | 430/223 |
| 4,579,817 | 4/1986 | Bergthaller et al. | 430/223 |
| 4,686,143 | 8/1987 | Yoshikawa et al. | |
| 5,272,047 | 12/1993 | Kovacs et al. | 430/495 |
| 5,500,325 | 3/1996 | Chapman et al. | 430/270.16 |

FOREIGN PATENT DOCUMENTS 4-62092  2/1992  Japan.

OTHER PUBLICATIONS

"Lange's Handbook of Chemistry", 14th Ed., Jame A. Dean, (©1992) pp. 9.2–9.7.

"Organic Chemistry", T.W.G. Solomons, (©1984) pp. 505.

"Basic Principles of Organic Chemistry", J.D. Roberts et al., (©1964) pp. 956.

Primary Examiner—Martin Angebranndt
Attorney, Agent, or Firm—John R. Everett; J. Jeffery Hawley

[57] ABSTRACT

A metallized azo-ether dye comprising an azo group linking a substituted 3-hydroxy-pyridine nucleus to a phenyl nucleus wherein the phenyl nucleus has an alkoxy or thioether substituent at its 2-position. The dye is useful in the recording layers of optical recording elements.

5 Claims, No Drawings

METALLIZED AZO-ETHER DYES FOR OPTICAL RECORDING LAYERS

CROSS-REFERENCE TO RELATED APPLICATIONS

This is a continuation in part of now abandoned U.S. patent application Ser. No. 08/361,006, filed Dec. 21, 1994, which is a continuation of U.S. patent application Ser. No. 08/140,641, filed Oct. 21, 1993; now abandoned.

FIELD OF THE INVENTION

The present invention relates to dyes. The dyes are useful in optical recording layers and elements.

BACKGROUND OF THE INVENTION

Optical recording materials for storing information are known. One of the currently popular forms of optical storage of information is the compact disk or CD. Digital information is stored in the form of low specular reflectivity marks or pits on an otherwise reflective background. In this format, the optical information is most often in the form of read only memory or ROM. Optical information is not usually recorded in real time but rather is produced by press molding. In a typical process, the optical recording substrate is first press molded with a master containing the digital information to be reproduced. Thus, the formed information is overcoated with a reflective layer and then with an optional protective layer. In those areas having the deformations or pits, the specular reflectivity is lower than in those areas not having the deformations.

It is desirable to produce optical recording media which, when recorded in real time, produces a record that mimics CD-ROM on read out. Read out is at about 780 nm. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back by means of a CD type player on a conventional television. Since the Photo CD is not recorded to its capacity in a single session, or played back only once, long time multi session recording and play back capacity is needed. Thus, the need for very stable recording materials.

One method for forming a recordable element that mimics conventional injection pressed CD elements is to provide a support having thereon, in order, a layer of a dye that absorbs recording radiation and generates the needed change in the specular reflectivity and a reflective layer. Exposure of the recording layer through the support by the recording beam heats the recording layer to an extent that it is said that the surface of the heat deformable support just adjacent to the recording layer surface is deformed, and the dye or dyes are changed to reduce specular reflectivity. Materials of this type are described in U.S. Pat. No. 4,940,618; European Patent Application 0,353,393 and Canadian Patent Application 2,005,520.

Commercially useful materials of the type described in these references have stringent requirements. One of these requirements is the long term stability of the recorded information on the Photo CD disks. Therefore, the materials used for the Photo CD disks must have very good light stability.

SUMMARY OF THE INVENTION

The present invention provides a metallized azo-ether dye comprising an azo group linking a substituted 3-hydroxypyridine nucleus to a phenyl nucleus wherein the phenyl nucleus has an alkoxy or thioether substituent at its 2-position. The dyes have good indices of refraction and excellent light stability.

The invention also provides an optical recording element comprising, in the following order, a light transmitting substrate a recording layer containing a dye and a light reflective layer wherein the dye is a metallized azo-ether dye according to this invention.

The invention further provides a method for recording optical information comprising the steps of:

providing an optical recording element comprising, in the following order, a light transmitting substrate a recording layer containing a metallized azo-ether dye according to this invention; and focusing an information modulated laser beam on the recording layer thereby forming a pattern of different refractive indices in the element.

DETAILED DESCRIPTION OF THE INVENTION

Representative azo-ether dyes of the invention are included within the general formula (I):

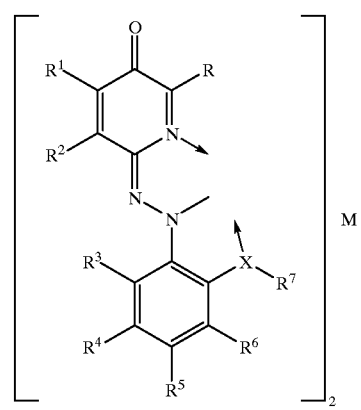

wherein;

R represents alkyl of 1 to 10 carbon atoms, amino, alkylamino, substituted or unsubstituted benzylamino;

$R^1$ represents hydrogen or alkyl of 1 to 6 carbon atoms;

$R^2$ and $R^4$ each independently, represent, hydrogen, alkyl of 1 to 6 carbon atoms, halogen, $SO_2R^8$ or $SO_2NR^9R^{10}$ wherein $R^8$, $R^9$ and $R^{10}$, each independently, represent alkyl of 1 to 10 carbon atoms, substituted or unsubstituted benzyl, aryl of 6 to 10 carbon atoms or a heteroaryl of 5 to 10 carbon atoms;

$R^1$ and $R^2$ or $R^3$ and $R^4$, taken together with the atoms to which they are attached, may form an aromatic ring such as benzene;

$R^3$ and $R^6$, each independently, represents hydrogen, alkyl of 1 to 4 carbon atoms or halogen;

$R^5$ is an electron withdrawing group;

$R^7$ represents alkyl of 1 to 6 carbon atoms, alkenyl of 3 to 6 carbon atoms, substituted or unsubstituted benzyl, aryl of 6 to 10 carbon atoms, heteroaryl of 5 to 10 carbon atoms, heteroarylmethyl of 6 to 10 carbon atoms or $-(CH_2)_nY$ wherein n is an integer from 1 to 5 and Y is a cyano or $COOR^8$;

X represents oxygen or sulfur; and

M is a divalent metal ion.

The electron withdrawing groups for $R^5$, are conventional negative Hammett sigma value groups disclosed in Lange's Handbook of Chemistry 14th edition, James A. Dean, McGraw-Hill, Inc., 9.1–9.7 (1992). Preferably, the electron withdrawing groups are nitro or cyano.

In the descriptions above, hetero- refers to thienyl and furyl. Alkyl can be a straight or branched chain group having up to about 10 carbon atoms, such as methyl, ethyl or isopropyl. Alkoxy can be, for example, ethoxy or butoxy. Aryl can be, for example, phenyl, aminophenyl or propionylaminophenyl. Heteroaryl can be 2-thienyl. Also, various substituents on the these groups are contemplated. For example, alkyl, aryl, heteroaryl, alkenyl group can be substituted with one or more alkoxy, alkoxycarbonyl, aryloxy, aryloxycarbonyl, carbamoyl, sulfamoyl, acylamino, sulfonylamino, halogen, ureido, hydroxy, carbamoyloxy, alkoxycarbonylamino, cyano, thiocyano or carboxy groups.

Various divalent metals are contemplated for M, illustrated above. Such divalent metals are copper, zinc or nickel, and others that are known to promote writability and a sufficient index of refraction.

Representative compounds within structure I are presented in Table I. In this table M represents nickel.

TABLE 1

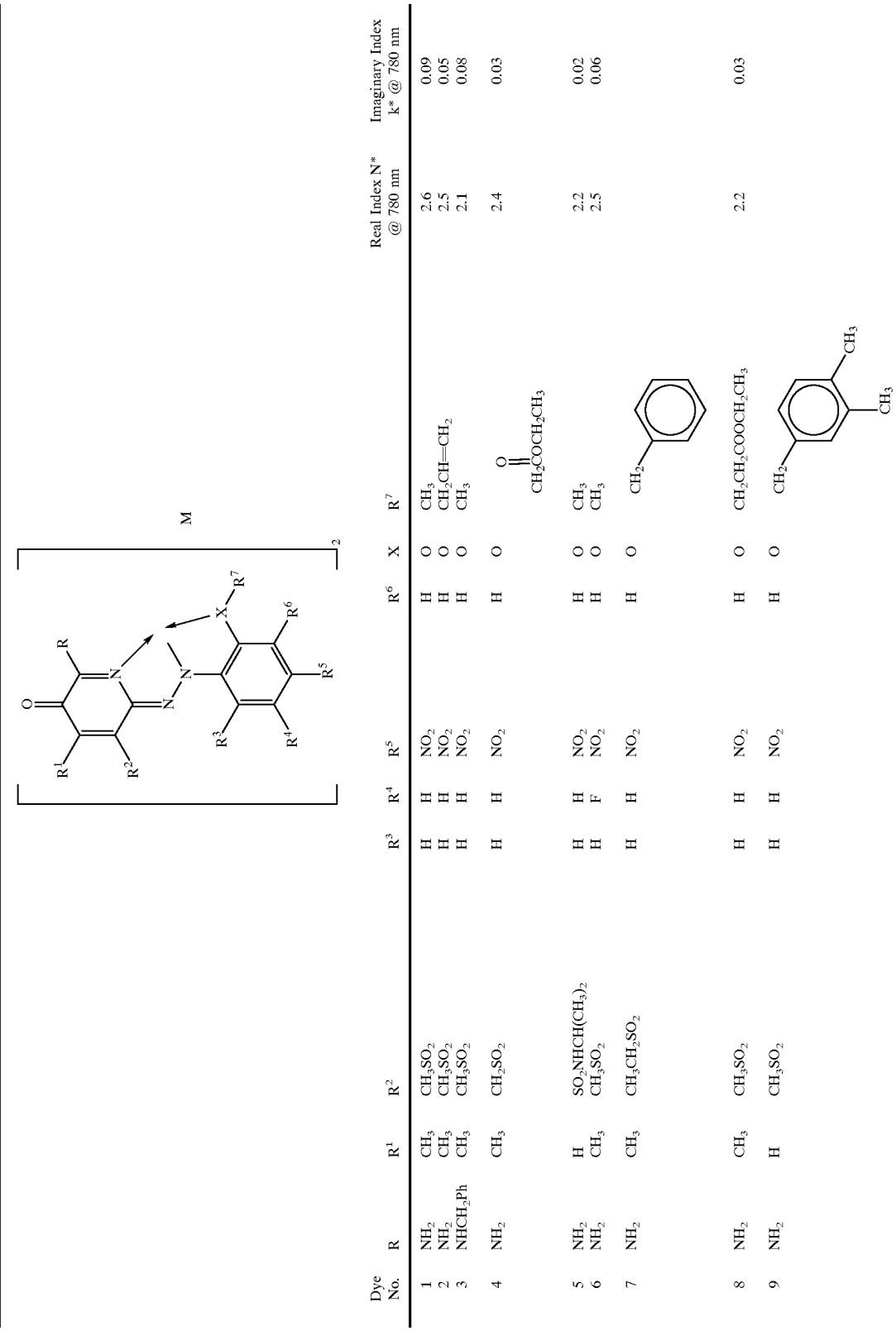

| Dye No. | R | $R^1$ | $R^2$ | $R^3$ | $R^4$ | $R^5$ | $R^6$ | X | $R^7$ | Real Index N* @ 780 nm | Imaginary Index k* @ 780 nm |
|---|---|---|---|---|---|---|---|---|---|---|---|
| 1 | $NH_2$ | $CH_3$ | $CH_3SO_2$ | H | H | $NO_2$ | H | O | $CH_3$ | 2.6 | 0.09 |
| 2 | $NH_2$ | $CH_3$ | $CH_3SO_2$ | H | H | $NO_2$ | H | O | $CH_2CH=CH_2$ | 2.5 | 0.05 |
| 3 | $NHCH_2Ph$ | $CH_3$ | $CH_3SO_2$ | H | H | $NO_2$ | H | O | $CH_3$ | 2.1 | 0.08 |
| 4 | $NH_2$ | $CH_3$ | $CH_3SO_2$ | H | H | $NO_2$ | H | O | $CH_2COCH_2CH_3$ | 2.4 | 0.03 |
| 5 | $NH_2$ | H | $SO_2NHCH(CH_3)_2$ | H | H | $NO_2$ | H | O | $CH_3$ | 2.2 | 0.02 |
| 6 | $NH_2$ | $CH_3$ | $CH_3SO_2$ | H | F | $NO_2$ | H | O | $CH_3$ | 2.5 | 0.06 |
| 7 | $NH_2$ | $CH_3$ | $CH_3CH_2SO_2$ | H | H | $NO_2$ | H | O | $CH_2Ph$ | | |
| 8 | $NH_2$ | $CH_3$ | $CH_3SO_2$ | H | H | $NO_2$ | H | O | $CH_2CH_2COOCH_2CH_3$ | 2.2 | 0.03 |
| 9 | $NH_2$ | H | $CH_3SO_2$ | H | H | $NO_2$ | H | O | 2,5-(CH_3)_2C_6H_3 | | |

TABLE 1-continued
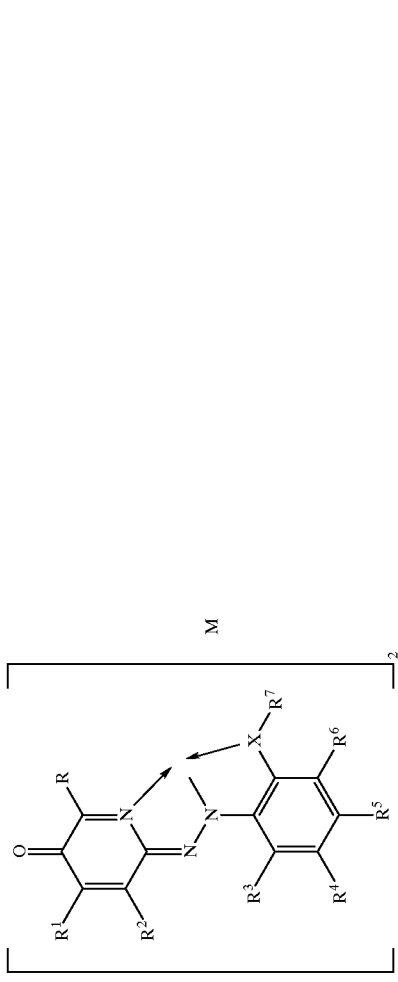
| Dye No. | R | $R^1$ | $R^2$ | $R^3$ | $R^4$ | $R^5$ | $R^6$ | X | $R^7$ | Real Index N* @ 780 nm | Imaginary Index k* @ 780 nm |
|---|---|---|---|---|---|---|---|---|---|---|---|
| 10 | $NH_2$ | $CH_3$ | $CH_3SO_2$ | H | H | $NO_2$ | H | S | $CH_2CH_2COOCH_2CH_3$ | 2.3 | 0.03 |
| 11 | $NH_2$ | $CH_3$ | $CH_3SO_2$ | H | H | $NO_2$ | H | O | $CH_2$–C$_6$H$_5$ | 2.3 | 0.05 |
| 12 | $NH_2$ | H | $CH_3SO_2$ | H | H | $NO_2$ | H | O | $CH_2$–C$_6$H$_4$–$C(CH_3)_3$ | 2.0 | 0.02 |
| 13 | $NH_2$ | H | H | H | H | C(CH$_3$)=C(CN)$_2$ | H | O | $CH_2$–C$_6$H$_5$ | 2.7 | 0.02 |
| 14 | $NH_2$ | $CH_3$ | $CH_3SO_2$ | H | H | $NO_2$ | H | O | $CH_2$–C$_6$H$_4$–$C(CH_3)_3$ | 2.1 | 0.02 |

TABLE 1-continued
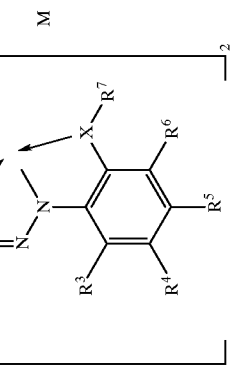
| Dye No. | R | $R^1$ | $R^2$ | $R^3$ | $R^4$ | $R^5$ | $R^6$ | X | $R^7$ | Real Index N* @ 780 nm | Imaginary Index k** @ 780 nm |
|---|---|---|---|---|---|---|---|---|---|---|---|
| 15 | $NH_2$ | H | Br | H | H | ![CN C=C CN CH₃] | | | | 2.7 | 0.08 |
| 16 | $NH_2$ | $CH_3$ | $SO_2NHCH(CH_3)_2$ | H | H | $NO_2$ | H | O | $CH_2$-phenyl | 2.2 | 0.01 |
| 17 | $NH_2$ | H | $CH_3CH_2SO_2$ | H | H | $NO_2$ | H | O | $CH_3$ | 2.4 | 0.04 |
| 18 | $NH_2$ | $CH_3$ | $CH_3CH_2SO_2$ | H | H | $NO_2$ | H | O | $CH_2$-(furan-COOCH₃) | 2.2 | 0.03 |
| 19 | $NH_2$ | H | $CH_3SO_2$ | H | H | $NO_2$ | H | O | $CH_3$ | 2.4 | 0.05 |
| 20 | $NH_2$ | $CH_3$ | $CH_3SO_2$ | H | H | $NO_2$ | H | O | $CH_2CH=CH_2$ | 2.5 | 0.05 |
| 21 | $NH_2$ | $CH_3$ | $CH_3CH_2CH(CH_3)CHSO_2$ | H | H | $NO_2$ | H | O | $CH_2$-phenyl | 2.2 | 0.02 |

TABLE 1-continued
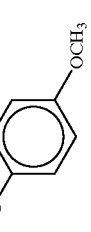
| Dye No. | R | R¹ | R² | R³ | R⁴ | R⁵ | R⁶ | X | R⁷ | Real Index N* @ 780 nm | Imaginary Index k** @ 780 nm |
|---|---|---|---|---|---|---|---|---|---|---|---|
| 22 | $NH_2$ | $CH_3$ | $CH_3CH_2SO_2$ | H | H | $NO_2$ | H | O | $CH_2$–C₆H₄–$OCH_3$ | | |
| 23 | $NH_2$ | $CH_3$ | $CH_3CH_2SO_2$ | H | H | $NO_2$ | H | O | $CH_2$-thienyl | 2.2 | 0.05 |
| 24 | $NH_2$ | $CH_3$ | $CH_3CH_2SO_2$ | H | H | $NO_2$ | H | O | $CH_2$–C₆H₄–$CH_3$ | | |
| 25 | $NH_2$ | $CH_3$ | $CH_3SO_2$ | H | H | $NO_2$ | H | O | $CH_2$–C₆H₄–$CH_3$ | 2.3 | 0.04 |

TABLE 1-continued

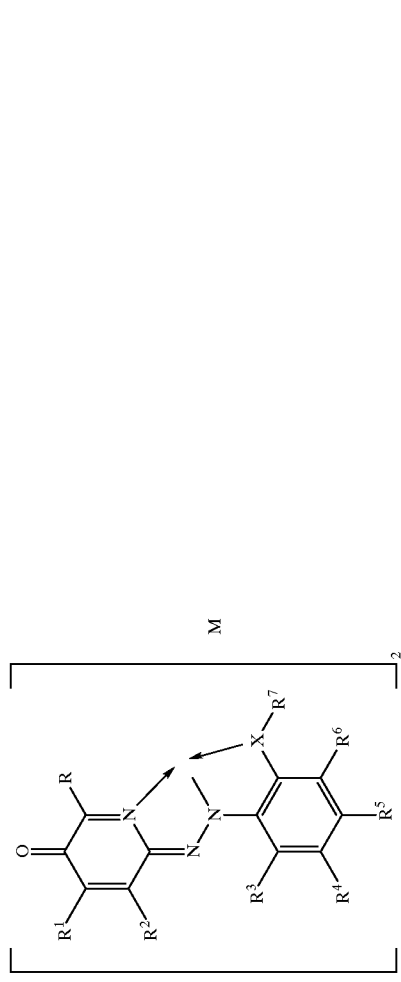

| Dye No. | R | $R^1$ | $R^2$ | $R^3$ | $R^4$ | $R^5$ | $R^6$ | X | $R^7$ | Real Index N* @ 780 nm | Imaginary Index k** @ 780 nm |
|---|---|---|---|---|---|---|---|---|---|---|---|
| 26 | $NH_2$ | $CH_3$ | $CH_3SO_2$ | H | H | $NO_2$ | H | O | $CH_2CH=CHCH_3$ | | 0.05 |
| 27 | $NH_2$ | $CH_3$ | $CH_3SO_2$ | H | H | $NO_2$ | H | O | $CH_2C=CH_2$<br>$\quad\ \ CH_3$ | 2.4 | 0.04 |
| 28 | $NH_2$ | H | $CH_3SO_2$ | H | H | $NO_2$ | H | O | $CH_3$ | 2.3 | |
| 29 | $NH_2$ | $CH_3$ | $CH_3CH_2SO_2$ | H | H | $NO_2$ | H | O | $CH_3CH=CH_2$ | | |
| 30 | $NH_2$ | $CH_3$ | $CH_3CH_2SO_2$ | H | H | $NO_2$ | H | O | ⌬ | 2.1 | 0.01 |
| 31 | $NH_2$ | $CH_3$ | $CH_3CH_2SO_2$ | H | H | $NO_2$ | H | O | $CH_2CH=CHCO_2CH_3$ | 2.1 | 0.06 |
| 32 | $NH_2$ | H | $CH_3CH_2SO_2$ | H | H | $NO_2$ | H | O | ⌬-$CH_2$ | 2.1 | 0.02 |

TABLE 1-continued
| Dye No. | R | R$^1$ | R$^2$ | R$^3$ | R$^4$ | R$^5$ | R$^6$ | X | R$^7$ | Real Index N* @ 780 nm | Imaginary Index k* @ 780 nm |
|---|---|---|---|---|---|---|---|---|---|---|---|
| 33 | NH$_2$ | CH$_3$ | CH$_3$SO$_2$ | H | F | NO$_2$ | H | O | CH$_2$—⌬—C(CH$_3$)$_3$ | | |
| 34 | NH$_2$ | CH$_3$ | CH$_3$CHSO$_2$ / CH$_3$ | H | H | NO$_2$ | H | O | CH$_2$—⌬—CH$_3$ | 2.2 | 0.03 |
*Real and Imaginary Indexes are given as measured by the Variable Angle Spectroscopic Ellipsometer (VASE) manufactured by G. A. Wollam Company The dyes of the invention are prepared by first alkylating a 2-hydroxy-4-nitroaniline with the an organic halide having the $R^7$ substituents defined above was carried out either in DMF or acetone using potassium carbonate as a base to form an alkoxy aniline derivative. The latter derivative is diazotized and coupled with a substituted 5-bromo-3-pyridinol. Bromine is displaced with sulfinate to form a 5-alkylsulfonyl-6-(2-alkoxy-phenyLazo)-3-pyridinol. The latter is metallized with a divalent metal salt. The following example 1 is presented to illustrate the general method in more detail.

EXAMPLE 1

Preparation of Compound 11, Table 1

First, 2-hydroxy-4-nitroaniline (8 g) was placed in a round bottom flask together with DMF (80 ml), potassium carbonate (8.7 g) and potassium iodide (0.1 g) and the mixture heated at 800 with stirring. Benzyl chloride (3.5 g) was added dropwise and heating continued for 4 hours. At the end of this time the mixture was added to ice and stirred vigorously. After the product solidified it was filtered off and washed with dilute sodium hydroxide solution followed by water. The nmr spectrum of the dried material was in accord with 2-benzyloxy-4-nitroaniline.

Next, the 2-benzyloxy-4-nitroaniline was diazotized with nitrosylsulfuric acid in a mixture of acetic and propionic acids. After 2 hours any excess nitrous acid was destroyed by the addition of urea and the diazo solution was added to a solution of 2-amino-5-bromo-3-hydroxy-4-methylpyridine (6 g) in methanol (300 mL.) containing sodium acetate (30 g) below 5°. [a.k.a. coupling process] When dye formation was complete the solution was diluted with water and the product, 2-amino-6-(2-benzyloxy—4-nitrophenylazo)-5-bromo-3-hydroxy-4-methylpyridine filtered off.

The above bromo compound was dissolved in DMF (100 ml) and treated with sodium methanesulfinate (2 g) and the mixture stirred for five hours. The product was isolated by pouring the mixture into water containing sodium nitrate (20 g) and filtering off the precipitated material. The dried dye material had an nmr spectrum in accord with the proposed structure.

The dye (was added to methanol (60 mL) and nickel acetate (0.63 g) added in portions with stirring while heating the solution at gentle reflux for 30 minutes. The solution was allowed to cool and the product filtered off. The absorption max in acetone was 613 nm and the extinction coefficient was $9.23 \times 10^4$.

Other dyes of Table 1 were prepared using similar procedures except for compounds 8, 10, 15, 16 and 24. For these five compounds the first step the above described general procedure was altered. Instead the thioether and ether substituted amine compounds were prepared by procedures known to those skilled in the art and than subjected to the remaining steps of the generally described process.

The optical recording elements of the invention comprises a light transmitting, typically pregrooved substrate, with the metallized azo-ether dye recording layer overlaying the substrate and a light reflective layer overlaying the light absorptive layer. A protective layer overlays the light reflective layer. The preferred embodiment is that of a writable compact disc (CD). The write and read lasers are of the laser diode type and operate in the infrared region between 770 and 830 nm.

Recording is accomplished by focusing an information (alphanumeric or image) modified laser beam on the azo-ether dye recording layer. The result causes a pattern of change in the specular reflectivity of the element. This pattern constitutes the recorded information. This pattern, when scanned by the read laser, is seen as a pattern of reflectivity modulation that is converted back into the recorded information by playback electronics. For the preferred CD format, the element is written with a diode laser emitting between 775 and 800 nm and read with a diode laser emitting between 775 and 800 nm. With the CD format, it is preferred that the metallized azo-ether dye be selected so that the real part of the complex refractive index (N) of the unwritten light absorptive layer measured with 780 nm light source is greater than 2.0 and the imaginary part (k) is 0.01 to 0.10.

The substrate may be any transparent material that satisfies the mechanical and optical requirements. Generally, the substrate is pregrooved with groove depths from 20 nm to 250 nm, groove widths 0.2 to 1 $\mu$ and a pitch of 1 to 2 $\mu$. The preferred material is polycarbonate. Other useful materials include glass, polymethylmethacrylate and other suitable polymeric materials.

The preparation of the optical recording element of the invention is achieved by spin coating of the metallized azo-ether dye either by itself, or with other dye or dyes or with addenda from a suitable solvent onto a transparent substrate. For coating, the metallized azo-ether dye with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methyl-2-propanol, methy ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

The reflective layer can be any of the metals conventionally used for reflective layer in optical recording layers. Useful metals can be vacuum evaporated or sputtered and include gold, silver, aluminum, copper and alloys of such metals thereof.

The protective layer over the reflective layer is similarly conventional for this art. Useful materials include UV curable acrylates. For more information on protective layers see James C. Fleming's *Optical Recording in Organic Media: Thickness Effects,* Journal of Imaging Science, Vol. 33, No. 3, May/June 1989, pages 65–68.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

The following examples demonstrate the utility of the dyes of the invention in optical recording elements.

EXAMPLES 2–8

Optical discs for examples 2 to 8 were prepared according to the following procedure:

A featureless polycarbonate disc substrate having a thickness of 1.2 mm, an outer diameter of 120 mm and an inner diameter of 15 mm was made by injection molding.

To form the light absorptive layer 1 part by weight of the selected dye was dissolved in 40 parts of 2,2,3,3-tetrafluoropropanol by volume with stirring for 1 hour at room temperature. Then the solution was filtered through a 0.2 μ filter. The solution was coated on the surface of the substrate by spin coating to an overall optical density as shown in Table 2 at 671 nm. It was dried at 80° C. for 15 minutes.

Then a gold reflective layer was deposited by resistive heating on the entire surface of the disc to about 1200 A thickness. A UV curable acrylate lacquer (DAICURE FD-17™ from Dainippon Inc. Chemical) was applied by spin coating onto the gold layer to a thickness of 7 to 11 um. It was UV cured with an 'H' bulb using a fusion system cure at 3000 W/inch power for 15 seconds.

To test the optical disc thus obtained, a test system consisting of an optical head with a 780 nm laser, a 0.5 NA lens, phase tracking and ½ aperture focusing was used. The optics used circularly polarized light to reduce laser feedback effects. Recording and play back were carried out with the same laser at 2.8 m/s rotational speed. The read power was kept at 0.6 mW. Single frequency was recorded with about 3.5 micron mark length at 18 mW write power, through 30 kHz filter, forming marks of lower reflectivity than the unmarked area when examined with a light source emitting at 788 nm light. When the marks were read the CNR (carrier signal to noise ratio) for the dyes is given in Table 2.

TABLE 2

| Example No. | Dye No. | Optical Density at 671 nm | CNR (dB) at 2.8 meters/sec 18 mW power |
|---|---|---|---|
| 2 | 1 | 1.56 | 62 |
| 3 | 2 | 1.46 | 59 |
| 4 | 3 | 0.89 | 51 |
| 5 | 4 | 1.50 | 59 |
| 6 | 14 | 1.35 | 60 |
| 7 | 13 | 1.50 | 62 |
| 8 | 15 | 1.38 | 58 |

The invention has been described with particular reference to preferred embodiments thereof but it will be understood that modifications can be made within the spirit and scope of the invention.

What is claimed is:

1. An optical recording element comprising in the following order, a light transmitting substrate, a recording layer containing a dye and a light reflective layer wherein the dye is:

(a) selected so that the real part of the complex refractive index (N) of the unwritten light recording layer measured with 780 nm light source is greater than 2.0 and the imaginary part (k) is 0.01 to 0.10 and (b) a metallized azo-ether dye having an azo group linking a 3-hydroxy-pyridine nucleus to a phenyl nucleus wherein the phenyl nucleus has an alkoxy substituent at its 2-position.

2. The optical recording element of claim 1 wherein the metallized azo dye has a structure according to formula I:

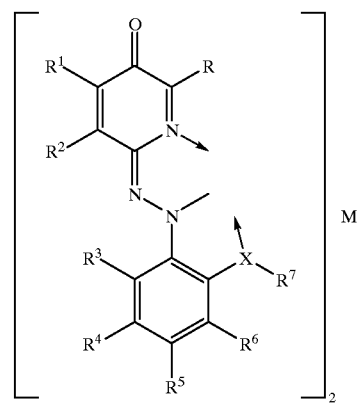

wherein;

R represents alkyl of 1 to 4 carbon atoms, amino, alkylamino or benzylamino;

$R^1$ represents hydrogen or alkyl of 1 to 6 carbon atoms;

$R^2$ and $R^4$ each independently, represent, hydrogen, alkyl of 1 to 6 carbon atoms, halogen, $SO_2R^8$ or $SO_2NR^9R^{10}$ wherein $R^8$, $R^9$ and $R^{10}$, each independently, represent alkyl of 1 to 10 carbon atoms, benzyl, aryl of 6 to 10 carbon atoms or a heteroaryl of 5 to 10 carbon atoms;

alternatively $R^1$ and $R^2$ or $R^3$ and $R^4$, taken together with the atoms to which they are attached, may form an aromatic ring;

$R^3$ and $R^6$, each independently, represents hydrogen, alkyl of 1 to 4 carbon atoms or halogen;

$R^5$ is an electron withdrawing group;

$R^7$ represents alkyl of 1 to 6 carbon atoms, alkenyl of 3 to 6 carbon atoms, aryl of 6 to 10 carbon atoms, heteroaryl of 5 to 10 carbon atoms, heteroarylmethyl of 6 to 10 carbon atoms or —$(CH_2)_n Y$ wherein n is an integer from 1 to 5 and Y is a cyano or $COOR^8$;

X represents oxygen; and

M is a divalent metal ion.

3. The optical recording element of claim 2 wherein the metallized azo dye is selected from the dyes of the following Table:

TABLE

[Structure: pyridone azo dye with R, R¹, R², R³, R⁴, R⁵, R⁶, X-R⁷ substituents, complexed with M, subscript 2]

| Dye No. | R | R¹ | R² | R³ | R⁴ | R⁵ | R⁶ | X | R⁷ | Real Index N* @ 780 nm | Imaginary Index k* @ 780 nm |
|---|---|---|---|---|---|---|---|---|---|---|---|
| 1 | NH₂ | CH₃ | CH₃SO₂ | H | H | NO₂ | H | O | CH₃ | 2.6 | 0.09 |
| 2 | NH₂ | CH₃ | CH₃SO₂ | H | H | NO₂ | H | O | CH₂CH=CH₂ | 2.5 | 0.05 |
| 3 | NHCH₂Ph | CH₃ | CH₃SO₂ | H | H | NO₂ | H | O | CH₃ | 2.1 | 0.08 |
| 4 | NH₂ | CH₃ | CH₃SO₂ | H | H | NO₂ | H | O | CH₂COCH₂CH₃ | 2.4 | 0.03 |
| 5 | NH₂ | H | SO₂NHCH(CH₃)₂ | H | H | NO₂ | H | O | CH₃ | 2.2 | 0.02 |
| 6 | NH₂ | CH₃ | CH₃SO₂ | H | F | NO₂ | H | O | CH₃ | 2.5 | 0.06 |
| 7 | NH₂ | CH₃ | CH₃CH₂SO₂ | H | H | NO₂ | H | O | CH₂Ph | | |
| 8 | NH₂ | CH₃ | CH₃SO₂ | H | H | NO₂ | H | O | CH₂CH₂COOCH₂CH₃ | 2.2 | 0.03 |
| 9 | NH₂ | H | CH₃SO₂ | H | H | NO₂ | H | O | 2,5-(CH₃)₂C₆H₃ | | |

TABLE-continued
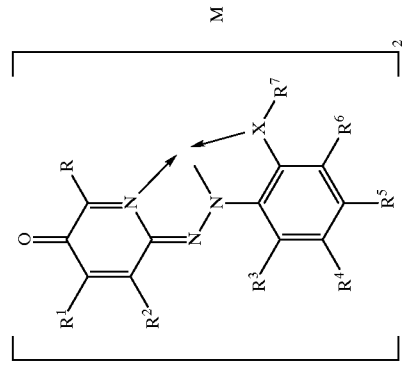
| Dye No. | R | R¹ | R² | R³ | R⁴ | R⁵ | R⁶ | X | R⁷ | Real Index N* @ 780 nm | Imaginary Index k* @ 780 nm |
|---|---|---|---|---|---|---|---|---|---|---|---|
| 10 | $NH_2$ | $CH_3$ | $CH_3SO_2$ | H | H | $NO_2$ | H | S | $CH_2CH_2COOCH_2CH_3$ | 2.3 | 0.03 |
| 11 | $NH_2$ | $CH_3$ | $CH_3SO_2$ | H | H | $NO_2$ | H | O | $CH_2$—C₆H₅ | 2.3 | 0.05 |
| 12 | $NH_2$ | H | $CH_3SO_2$ | H | H | $NO_2$ | H | O | $CH_2$—C₆H₄—$C(CH_3)_3$ | 2.0 | 0.02 |
| 13 | $NH_2$ | H | H | H | H | C(CN)=C(CN)CH₃ | H | O | $CH_2$—C₆H₅ | 2.7 | 0.02 |
| 14 | $NH_2$ | $CH_3$ | $CH_3SO_2$ | H | H | $NO_2$ | H | O | $CH_2$—C₆H₄—$C(CH_3)_3$ | 2.1 | 0.02 |

TABLE-continued
| Dye No. | R | $R^1$ | $R^2$ | $R^3$ | $R^4$ | $R^5$ | $R^6$ | X | $R^7$ | Real Index N* @ 780 nm | Imaginary Index k* @ 780 nm |
|---|---|---|---|---|---|---|---|---|---|---|---|
| 15 | $NH_2$ | H | Br | H | H |  | H | O |  CH$_2$ | 2.7 | 0.08 |
| 16 | $NH_2$ | $CH_3$ | $SO_2NHCH(CH_3)_2$ | H | H | $NO_2$ | H | O |  CH$_2$ | 2.2 | 0.01 |
| 17 | $NH_2$ | H | $CH_3CH_2SO_2$ | H | H | $NO_2$ | H | O | $CH_3$ | 2.4 | 0.04 |
| 18 | $NH_2$ | $CH_3$ | $CH_3CH_2SO_2$ | H | H | $NO_2$ | H | O |  CH$_2$ | 2.2 | 0.03 |
| 19 | $NH_2$ | H | $CH_3SO_2$ | H | H | $NO_2$ | H | O | $CH_3$ | 2.4 | 0.05 |
| 20 | $NH_2$ | $CH_3$ | $CH_3SO_2$ | H | H | $NO_2$ | H | O | $CH_2CH=CH_2$ | 2.5 | 0.05 |
| 21 | $NH_2$ | $CH_3$ | $CH_3CH_2$<br>$\phantom{xx}$CHSO$_2$<br>$CH_3$ | H | H | $NO_2$ | H | O |  CH$_2$ | 2.2 | 0.02 |

TABLE-continued
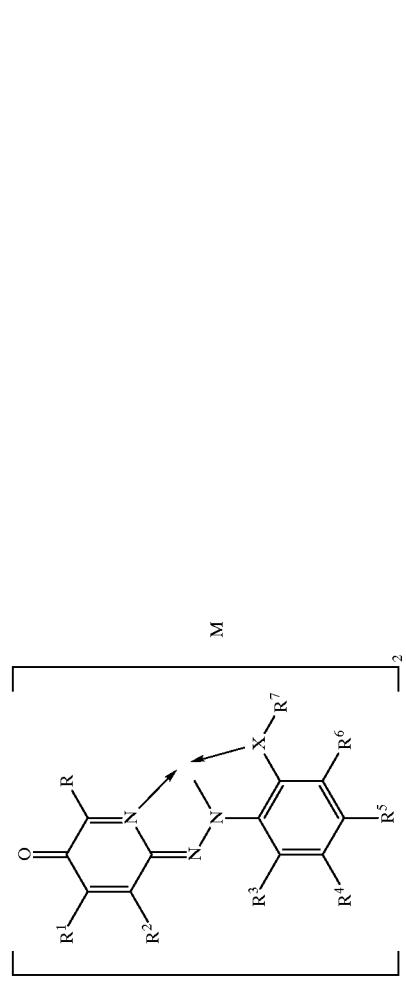
| Dye No. | R | R¹ | R² | R³ | R⁴ | R⁵ | R⁶ | X | R⁷ | Real Index N* @ 780 nm | Imaginary Index k* @ 780 nm |
|---|---|---|---|---|---|---|---|---|---|---|---|
| 22 | $NH_2$ | $CH_3$ | $CH_3CH_2SO_2$ | H | H | $NO_2$ | H | O | $CH_2$–C₆H₄–OCH₃ (p) | | |
| 23 | $NH_2$ | $CH_3$ | $CH_3CH_2SO_2$ | H | H | $NO_2$ | H | O | $CH_2$–(2-thienyl) | 2.2 | 0.05 |
| 24 | $NH_2$ | $CH_3$ | $CH_3CH_2SO_2$ | H | H | $NO_2$ | H | O | $CH_2$–C₆H₄–CH₃ (m) | | |
| 25 | $NH_2$ | $CH_3$ | $CH_3SO_2$ | H | H | $NO_2$ | H | O | $CH_2$–C₆H₄–CH₃ (m) | 2.3 | 0.04 |

TABLE-continued
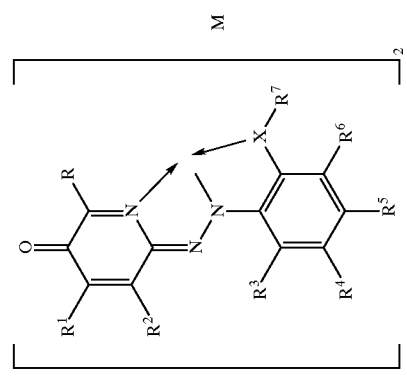
| Dye No. | R | R¹ | R² | R³ | R⁴ | R⁵ | R⁶ | X | R⁷ | Real Index N* @ 780 nm | Imaginary Index k* @ 780 nm |
|---|---|---|---|---|---|---|---|---|---|---|---|
| 26 | $NH_2$ | $CH_3$ | $CH_3SO_2$ | H | H | $NO_2$ | H | O | $CH_2CH=CHCH_3$ | | |
| 27 | $NH_2$ | $CH_3$ | $CH_3SO_2$ | H | H | $NO_2$ | H | O | $CH_2C=CH_2$ \| $CH_3$ | | |
| 28 | $NH_2$ | H | $CH_3SO_2$ | H | H | $NO_2$ | H | O | $CH_3$ | 2.4 | 0.05 |
| 29 | $NH_2$ | $CH_3$ | $CH_3CH_2SO_2$ | H | H | $NO_2$ | H | O | $CH_2CH=CH_2$ | 2.3 | 0.04 |
| 30 | $NH_2$ | $CH_3$ | $CH_3CH_2SO_2$ | H | H | $NO_2$ | H | O | ⟨phenyl-$CH_3$⟩ | 2.1 | 0.01 |
| 31 | $NH_2$ | $CH_3$ | $CH_3CH_2SO_2$ | H | H | $NO_2$ | H | O | $CH_2CH=CHCO_2CH_3$ | 2.1 | 0.06 |
| 32 | $NH_2$ | H | $CH_3CH_2SO_2$ | H | H | $NO_2$ | H | O | ⟨phenyl⟩-$CH_2$ | 2.1 | 0.02 |

TABLE-continued
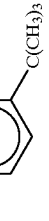
| Dye No. | R | $R^1$ | $R^2$ | $R^3$ | $R^4$ | $R^5$ | $R^6$ | X | $R^7$ | Real Index N* @ 780 nm | Imaginary Index k* @ 780 nm |
|---|---|---|---|---|---|---|---|---|---|---|---|
| 33 | $NH_2$ | $CH_3$ | $CH_3SO_2$ | H | F | $NO_2$ | H | O | $CH_2$—⟨C$_6$H$_4$⟩—$C(CH_3)_3$ | | |
| 34 | $NH_2$ | $CH_3$ | $CH_3CHSO_2$ $\quad CH_3$ | H | H | $NO_2$ | H | O | $CH_2$—⟨C$_6$H$_4$⟩—$CH_3$ | 2.2 | 0.03 |
*Real and Imaginary Indexes are given as measured by the Variable Angle Spectroscopic Ellipsometer (VASE) manufactured by G. A. Wollam Company.

4. The optical recording element of claim 3 wherein the metallized azo ether dye is selected from the group consisting of dyes 1, 14 and 26 of the Table appearing in claim 3.

5. A method for recording optical information, comprising the steps of:

providing an optical recording element comprising, in the following order, a light transmitting substrate, a recording layer containing a dye and a light reflective layer wherein the dye is:

(a) selected so that the real part of the complex refractive index (N) of the unwritten light recoding layer measured with 780 nm light source is greater than 2.0 and the imaginary part (k) is 0.01 to 0.10 and (b) a metallized azo-ether dye having an azo group linking a 3-hydroxy-pyridine nucleus to a phenyl nucleus wherein the phenyl nucleus has an alkoxy substituent at its 2-position; and focusing an information modulated laser beam emitting between 775 and 800 nm on the recording layer thereby forming a pattern of different specular reflectivity in the element.

* * * * *